United States Patent Office 3,616,758
Patented Nov. 2, 1971

3,616,758
SHELL FOR THE IMMOBILIZATION OF ANIMALS
Vladil Afanasievich Komarov, St. Grafskaya Voronezhsky gosudarstvenny zapovednik, Voronezhskaya obl., U.S.S.R.
Filed Oct. 24, 1968, Ser. No. 770,216
Int. Cl. F42b *11/30*
U.S. Cl. 102—92                                   19 Claims

ABSTRACT OF THE DISCLOSURE

A shell for the immobilization of animals comprises a hollow body having opposite ends one of which is open and the other of which is closed. A ballistic head is seated in the open end of the hollow body and an immobilizing substance is contained in the hollow body. A sealing layer of fat is interposed between the ballistic head and the immobilizing substance to prevent the immobilizing substance from being exposed to the atmosphere should there be a leak in the hermetic sealing of the ballistic head in the hollow body. A plurality of guide grooves are provided on the exterior of the hollow body in intersecting relation along which the body deforms upon impact with an animal.

---

The invention relates to means of catching animals as in hunting in forestries in order to regulate their population, as well as for the purposes of translocations, selection, and marking, in order to gather biological and biometric information and for conducting zoological and veterinary research.

The invention is primarily designed for immobilizing large wild animals under natural conditions by means of injecting in their tissues substances which cause temporary paralysis of their limbs.

Known in the world practice of catching large wild animals are several appliances for remote injection of immobilizing preparations. Immobilizing pastes and viscous mixtures are introduced with the help of shells made as arrows. Liquid immobilizing preparations are injected by means of shells made as syringes of various types. These shells are fired from special gas and pneumatic rifles and guns, as well as from conventional rifles and guns, bows and arbalests specially rearranged for the purpose.

The most perfect and universal immobilizing shells are syringes, though they also suffer from some disadvantages which reduce their efficiency.

The amount of solution of the immobilizing preparation to be introduced sets limits to the possibility of reducing the dimensions and weight of a shell, while to make the force of an impact of a heavy and cumbersome syringe on the animal body insignificant, to avoid serious injuries, it is necessary that the syringe have a low speed of flight.

Low speed results in a short range of operation. The majority of the syringe designs fail to provide for the successful striking of an animal at a distance over 70–90 meters.

Moreover, the 70-m. effective range is often insufficient in the field conditions, since because of the low speed of the shell, animals sometimes manage to change position before the shell reaches them.

Since the trajectory of the shell flight is very steep, it can hardly be used in the woods. Its use in windy weather is also limited because of the considerable size of the shell at low speed of its flight. The shape of syringes is far from perfect and they are cumbersome, hence the low accuracy. In cold weather, below 0° C., the solution of the immobilizing substance in the shell freezes. This complicates the work in winter and under the conditions of the Northern regions. The shells filled with solution can be preserved for several days only, while in hot weather, for several hours. They are complicated of design, ten or more parts, and uneconomical.

An object of the present invention is to design a shell for the immobilization of animals, which should provide for the required range of operation and speed of flight, reliable operation irrespective of temperature and atmospheric conditions, and which should be simple in design and efficient. Another object of the invention is to make the shell streamlined to ensure more accurate hitting of the target.

One more object of the invention is to provide for the possibility of reliable release of the immobilizing substance into the tissues of the animal.

According to these and other objects, the shell is made as an expanding bullet whose cavity is filled with at least one solid immobilizing substance. This shell can be used with rifled arms and, consequently, provides for long range of operation, flat trajectory and high accuracy. The burst of the shell (expansion) ensures complete release of the dose of immobilizing substance into the animal's tissues. The use of a solid immobilizing substance provides an opportunity to enclose the required dose thereof into a small size shell, thereby diminishing the degree of injury inflicted upon the animal less serious.

Curare-like substances of the succamethonium group can be employed as immobilizing substances in the shell. They are responsible for the immobilization of the animal.

To make the shell streamlined, it is fitted with a ballistic head, which provides for the accuracy of hitting the target. The ballistic head also serves as a sealing element insulating the contents of the shell from the surrounding medium.

For the sake of proper and reliable installation of the ballistic head in the shell the former is made insertable with its base into the upper part of the ôperating cavity, thus sealing the contents of the shell and providing for its proper opening.

In order that the deformation and burst of the bullet do not cause the wedging and jamming of its contents inside its cavity, the bullet can have burst grooves provided on the outside surface. These grooves ensure reliable release of immobilizing substances even when the shell is fired at sharp angles. Moreover, said grooves make for reducing the weight of the shell.

It is expedient that the shell be provided with longitudinal and circular grooves on the surface. The longitudinal grooves help release the contents of the operating cavity when the shell body bursts along them. However, in this case, the strips of the bullet walls connected to its bottom bend sideways increasing the cross-section of the shell and, consequently, the size of the wound channel. The circular grooves facilitate separation of the body strips from the bullet bottom and separation of the shell to pieces. This helps sharply reduce the speed and the size of wound.

In the front part of the bullet, above the immobilizing substance a substance without any immobilizing properties can be placed. It precludes the untimely release of the immobilizing substance and washing of the latter out of the wound by the flow of blood and occupies part of the operating cavity, depending upon the charged dose of the immobilizing substance.

Glucose can be employed as such a substance without immobilizing properties. It does not enter into reaction with the immobilizing substance in the bullet and can be stored for a long period of time without decomposing. Glucose is harmless, has no irritating properties, is readily soluble in tissue fluids.

Other objects and advantages of the invention will be apparent from the preferred embodiment of the invention which now will be described with reference to the appended drawings in which.

Figures 1, 2, 3:
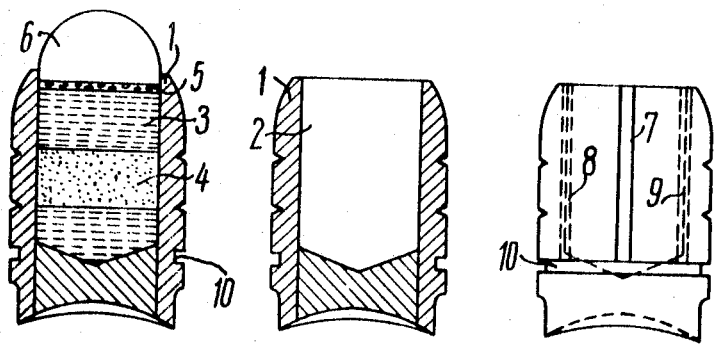
FIG. 1 is a schematic view of a charged bullet, in longitudinal section.
FIG. 2 is a schematic view of an uncharged bullet.
FIG. 3 is the general view of the same bullet with partial section.

The bullet has body 1 provided with a cavity 2 filled from the top and from the bottom with glucose 3, immobilizing substance 4 placed between the layers of glucose 3 and sealing layer of fat 5. The nose portion of the bullet is capped with ballistic head 6. The bullet surface has burst grooves 7, 8, 9 and 10, of which grooves 7, 8, 9 are longitudinal, and groove 10 is circular.

The bullet is designed on the basis of 5.6-mm. calibre for a live holder. Body 1 of the bullet is made of lead. Longitudinal burst grooves 7, 8, 9 are located along the shell axis, on its external surface, at equal intervals. The cross-section of the longitudinal groove is trihedral.

Circular slot 10 is disposed in the horizontal plane of the bullet. This groove has in elevation a rectangular cross-section.

The dose of the immobilizing substance occupies only part of the operating cavity of the bullet. The rest is filled with powder-like glucose 3. Glucose is placed in the shell in two layers at the bottom of the bullet cavity and between ballistic head 6 and immobilizing substance 4.

Such an arrangement of the layers of glucose 3 allows the release of the immobilizing substance directly upon the contact with the animal body, as well as of an incomplete release of the substance upon partial burst of the shell.

Immobilizing substance 4 is located between the layers of glucose. Used as immobilizing preparations can be synthetic substances of curare-like action of the succamethonium group-dithilinum, succinylcholine chloride, succamethonium bromide in solid state. Adequate solubility of these substances in blood provides for practically the same speed of the immobilization of the animal as in the case when liquid solutions are injected.

The use of other immobilizing substances and mixtures is not ruled out.

Doses of immobilizing substances vary with the species of animals. For instance, to immobilize great European deer in winter time with dithilinum or succamethonium a dose of 20-30 mg. is required for adult stags and female deer, and 15-20 mg. for young deer.

Dithilinum causes paralysis in 11.5 minutes on the average, while succamethonium—in 13.4 minutes. The paralysis from both preparations lasts from 26 to 45 minutes. The search in the woods for the wounded animals should be started in 9-11 minutes.

Instead of the lower layer of glucose 3 antisecretory, tranquilizing, antiseptic, etc. substances can be used, depending on the requirements, chemically compatible with the immobilizing preparation.

The immobilizing substance and glucose in the bullet are compressed with the force of several kilograms.

On the upper layer of glucose 3 sealing layer 5 of fat can be placed, consisting from a mixture of anhydrous lanoline and cocoa oil, said layer being used in the case of violation of the hermetic sealing of the ballistic head fitting. It also precludes contact of the immobilizing substance with the surrounding medium.

Ballistic head 6 covers the bullet cavity after it is charged and makes the bullet streamlined. The base of ballistic head 6 enters the upper portion of cavity 2 of the shell, thus ensuring hermetic sealing of the bullet and the stable position of the head on it. The ballistic head can be made of plasticine. It also can be used to plaster the burst grooves to preclude the discharge of powder gases. Moreover, the ballistic head can be made of self-hardening plastics, melted mixture of anhydrous lanoline and cocoa oil at 1:1.5 ratio with a generous addition of the streptocid album powder, etc.

The mixture of lanoline and cocoa oil melts at the temperature of the animal body and is harmless.

The bullet in the cartridge case is carefully, so that the ballistic head is kept intact, inserted into the cartridge chamber. The breech-block is to be closed. The gun is ready for use. After the sight division corresponding to the distance is set, the bullet can be fired. One should aim at large muscles of lower extremities of the animal. The bullet can be fired at an angle of 30° or more. At smaller angles the bullet may just slide by the skin of the animal.

If the bullet hits the target, the following takes place: ballistic head 6 flattens, expanding the metal of the body under head 6. The head then tears away and the lead body begins to rip along burst grooves 7, 8, 9 and release glucose 3 of the upper layer, and then immobilizing substance 4. The torn away strips of body 1 bend sideways as a result of their resistance to the shell movement, twist and tear away from the bullet bottom along circular groove 10. The shell loses its speed and only five little fragments of it stay in the muscles. Three of them are parts of the bullet walls, one—the bottom of the bullet, and one—the deformed ballistic tip.

If the distance from the animal exceeds 70-80 m. the incomplete burst of the bullet is possible. The bullet remains in the form of a metal plate. It does not affect the quality of the immobilization. The bullet fragments are small and should not be removed as they do not disturb the animal. The usual depth of the wound channel is 6-9 cm. if the target is hit properly, and is quite safe for large animals; bruises in muscles and under fascias resulting from the impact with the bullet heal quickly.

The released immobilizing substance is absorbed by blood and carried through the body causing temporary paralysis of the animal.

The bullet has been successfully used to immobilize moose, bison and large numbers of great European deer.

The possibility of employing the bullet for the immobilization of other types of large animals is not ruled out.

We claim:

1. A shell for the immobilization of animals, said shell comprising a hollow body, said hollow body having opposite ends one of which is open and the other of which is closed, a ballistic head extending into and closing the open end of the hollow body, a solid immobilizing substance contained in the hollow body, sealing means interposed between the ballistic head and immobilizing substance, and guide means provided on said body and extending in mutually intersecting relation along which said body deforms upon impact with an animal.

2. A shell as claimed in claim 1 wherein curare-like substance of the succamethonium group is constituted as the immobilizing substance.

3. A shell as claimed in claim 2 wherein the bullet has burst grooves.

4. A shell as claimed in claim 3 wherein the burst grooves are made longitudinal and circular.

5. A shell as claimed in claim 2 wherein placed into the front part of the bullet above the immobilizing substance is at least one substance being free from immobilizing properties.

6. A shell as claimed in claim 6 wherein glucose is used as the substance being free from immobilizing properties.

7. A shell as claimed in claim 1 wherein said ballistic head is insertable into said open end.

8. A shell as claimed in claim 7 wherein the bullet has burst grooves.

9. A shell as claimed in claim 8 wherein the burst grooves are made longitudinal and circular.

10. A shell as claimed in claim 1 wherein placed into the front part of the bullet above the immobilizing substance is at least one substance being free from immobilizing properties.

11. A shell as claimed in claim 10 including a further substance which is free from immobilizing properties, said immobilizing substance being interposed between each of said substances which are free from immobilizing properties, the latter constituting in part said sealing means and acting to control the release of said immobilizing substance into the animal.

12. A shell as claimed in claim 10 wherein glucose is constituted as the substance being free from immobilizing properties.

13. A shell as claimed in claim 12 wherein the bullet has burst grooves.

14. A shell as claimed in claim 13 wherein the burst grooves are made longitudinal and circular.

15. A shell as claimed in claim 10 wherein the bullet has burst grooves.

16. A shell as claimed in claim 15 wherein the burst grooves are made longitudinal and circular.

17. A shell as claimed in claim 1 wherein the bullet has burst grooves.

18. A shell as claimed in claim 17 wherein the burst grooves are made longitudinal and circular.

19. A shell as claimed in claim 1 wherein said sealing means includes a layer of fat.

References Cited

UNITED STATES PATENTS

| | | | |
|---|---|---|---|
| 1,741,900 | 12/1929 | Alden | 102—92 X |
| 3,417,697 | 12/1968 | Lucy et al. | 102—92 X |
| 3,429,263 | 2/1969 | Snyder et al. | 102—92 X |

OTHER REFERENCES

Merck Index, 7th edition, pub. by Merck & Co., Inc., 1960, pp. 989, 990 and cover sheet.

ROBERT F. STAHL, Primary Examiner

U.S. Cl. X.R.

128—DIG. 11